United States Patent
Matsuda

(10) Patent No.: US 9,858,613 B2
(45) Date of Patent: Jan. 2, 2018

(54) SERVER DEVICE AND PROGRAM IN CARTRIDGE ORDERING SYSTEM

(71) Applicant: Brother Kogyo Kabushiki Kaisha, Nagoya-shi, Aichi-ken (JP)

(72) Inventor: Makoto Matsuda, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 15/637,572

(22) Filed: Jun. 29, 2017

(65) Prior Publication Data

US 2017/0301006 A1  Oct. 19, 2017

Related U.S. Application Data

(63) Continuation of application No. 15/085,191, filed on Mar. 30, 2016, now Pat. No. 9,710,782.

(30) Foreign Application Priority Data

Mar. 31, 2015  (JP) .................................. 2015-073936

(51) Int. Cl.
*G06Q 10/08*  (2012.01)
*G06F 3/12*  (2006.01)
*G06Q 30/06*  (2012.01)

(52) U.S. Cl.
CPC ....... *G06Q 30/0635* (2013.01); *G06F 3/1204* (2013.01); *G06F 3/1293* (2013.01); *G06Q 10/087* (2013.01)

(58) Field of Classification Search
CPC  G06C 30/0635; G06Q 10/087; G06F 3/1293; G06F 3/1204

USPC ........................................................ 358/1.15
See application file for complete search history.

(56) References Cited

U.S. PATENT DOCUMENTS

| | | |
|---|---|---|
| 8,919,900 B2 | 12/2014 | Yamagata et al. |
| 2001/0028802 A1 | 10/2001 | Otomo et al. |
| 2002/0024543 A1 | 2/2002 | Kimura et al. |
| 2002/0077979 A1 | 6/2002 | Nagata |
| 2002/0091585 A1* | 7/2002 | Asauchi ............... G06Q 10/087 705/60 |
| 2003/0040984 A1 | 2/2003 | Inami et al. |
| 2003/0050873 A1* | 3/2003 | Niki ..................... G06Q 10/087 705/28 |

(Continued)

FOREIGN PATENT DOCUMENTS

JP  2002-099594 A  4/2002
JP  2003-063104 A  3/2003

(Continued)

*Primary Examiner* — Allen H Nguyen
(74) *Attorney, Agent, or Firm* — Banner & Witcoff, Ltd.

(57) ABSTRACT

A server device includes a communication unit, a storage unit, and a control unit. The control unit is configured to perform determining whether or not the residual amount of recording material in a cartridge is equal to or less than a first threshold, and determining whether or not the estimated number of cartridges is equal to or less than a second threshold. In response to determining that the recording material is not more than the first threshold and the number of cartridges is not more than the second threshold, the control unit transmits to an external device via the communication unit an order instruction to deliver a cartridge to the user of the image forming apparatus.

22 Claims, 11 Drawing Sheets

(56) References Cited

U.S. PATENT DOCUMENTS

2005/0196180 A1  9/2005  Harumoto
2008/0243649 A1  10/2008  Arakawa
2010/0191620 A1  7/2010  Sunata

FOREIGN PATENT DOCUMENTS

JP  2008-243057 A  10/2008
JP  2013-030013 A  2/2013

* cited by examiner

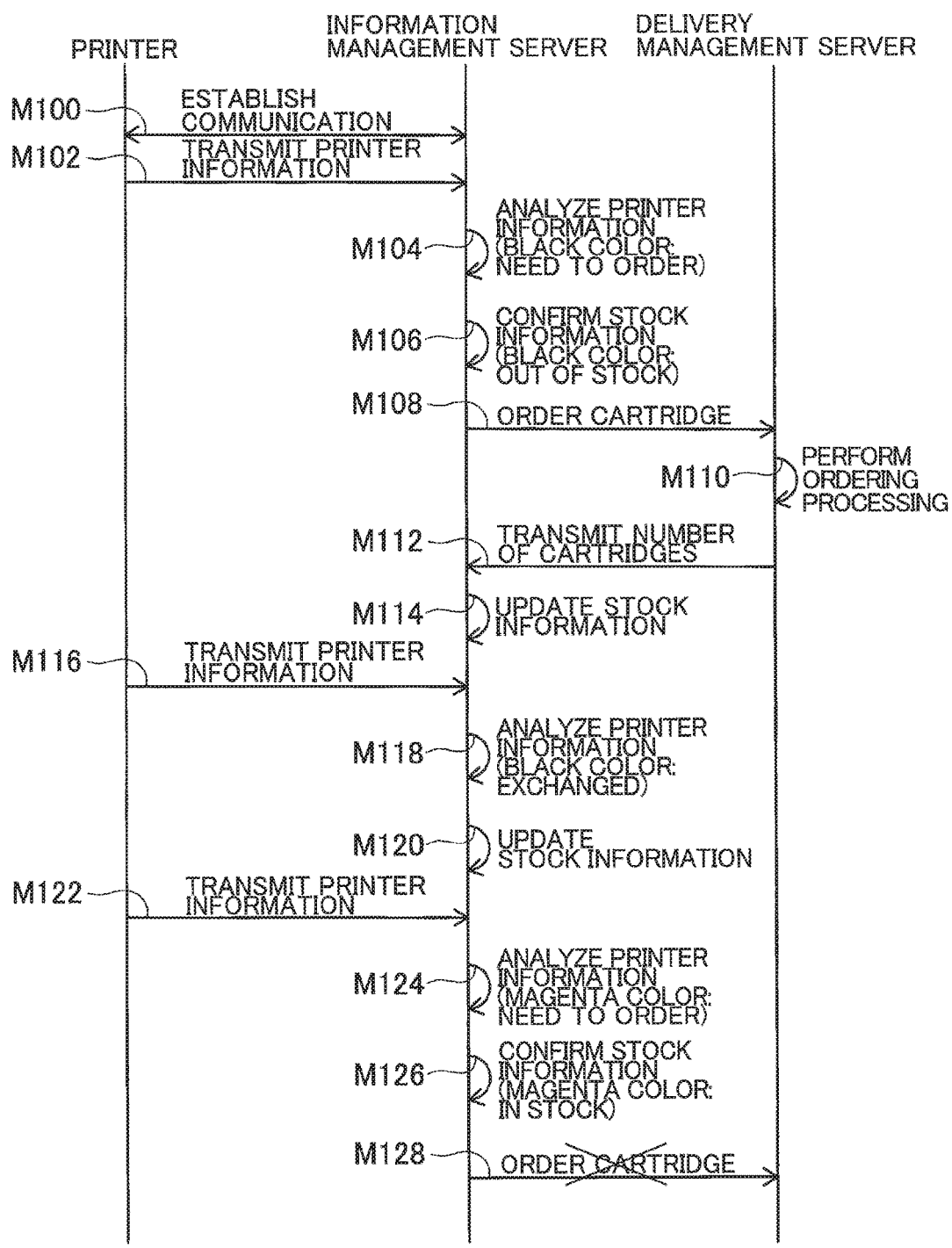

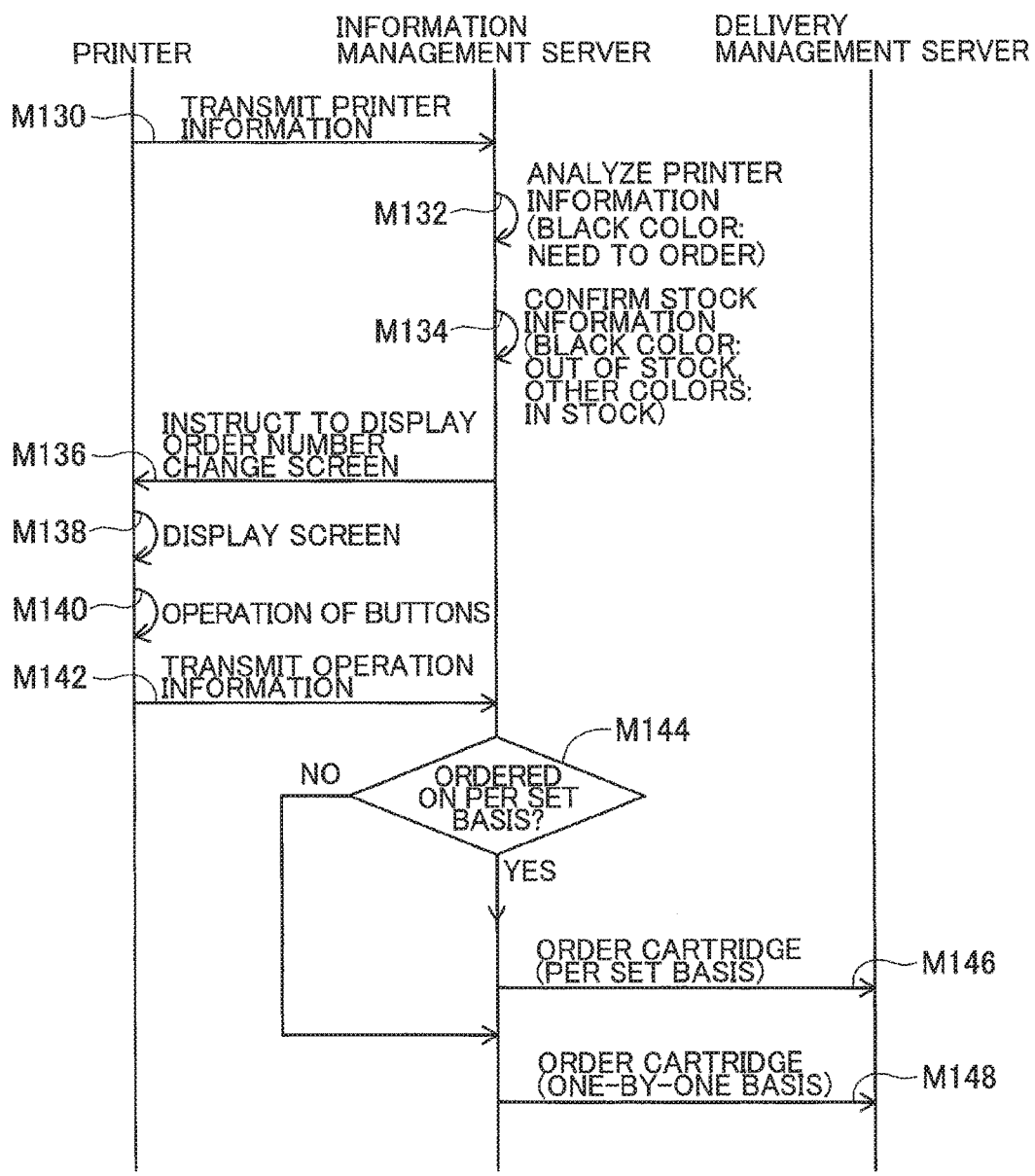

SERVER DEVICE AND PROGRAM IN CARTRIDGE ORDERING SYSTEM

CROSS REFERENCE TO RELATED APPLICATION

This application is a continuation of prior U.S. application Ser. No. 15/085,191, filed Mar. 30, 2016, which claims priority from Japanese Patent Application No. 2015-073936 filed Mar. 31, 2015. The entire content of the priority application is incorporated herein by reference.

TECHNICAL FIELD

The present disclosure relates to a server device and a program in a cartridge ordering system.

BACKGROUND

An image recording apparatus records an image onto a recording paper by making recording material such as ink adhere onto the recording paper. Thus, recording processing of the image recording apparatus involves purchase and management of consumables such as a cartridge filled with the recording material; however, the purchase and management of the consumables are troublesome to a user. Thus, in recent years, some services provide management, delivery, or the like of the cartridge. In such services, a new cartridge is ordered in response to the attachment of a spare cartridge to the image forming apparatus.

SUMMARY

In the above service, when a delivery unit of the cartridge is a smallest unit, the frequency of delivery needs to be increased, resulting in low efficiency. Thus, it is better to deliver a certain number of cartridges at once.

It is therefore an object of the disclosure to perform management of the cartridge efficiently when a certain number of cartridges are delivered at once. According to one aspect, a server device includes a communication unit, a storage unit, and a control unit. The communication unit is configured to communicate at least with an external device. The storage unit stores device identification information for identifying an image forming apparatus communicable with the server device via the communication unit. The image forming apparatus is configured to form an image on a recording sheet by using recording material. The recording material is contained in a cartridge attachable to and detachable from the image forming apparatus. The control unit is configured to perform: (a) receiving, via the communication unit, residual amount information about residual amount of the recording material remaining in the cartridge connected to the image forming apparatus identified by the device identification information; (b) acquiring number information about number of the cartridges being delivered; (c) estimating, based on at least the number information, the number of the cartridges in stock at a user of the image forming apparatus identified by the device identification information; (d) determining, based on the residual amount information, whether or not the residual amount of the recording material is equal to or less than a first threshold; (e) determining whether or not the estimated number of the cartridges is equal to or less than a second threshold; and (f) in response to affirmative determination made in (d) and affirmative determination made in (e), transmitting to the external device via the communication unit an order instruction to deliver a cartridge to the user of the image forming apparatus.

According to one aspect, a non-transitory computer readable storage medium storing a set of program instructions installed on and executed by a server device. The server device includes a communication unit and a storage unit. The communication unit is configured to communicate at least with an external device. The storage unit stores device identification information for identifying an image forming apparatus communicable with the server device via the communication unit, the image forming apparatus being configured to form an image on a recording sheet by using recording material. The recording material is contained in a cartridge attachable to and detachable from the image forming apparatus. The program instructions including (a1) receiving, via the communication unit, residual amount information about residual amount of the recording material remaining in the cartridge connected to the image forming apparatus identified by the device identification information; (b1) acquiring number information about number of the cartridges being delivered; (c1) estimating, based on at least the number information, the number of the cartridges in stock at a user of the image forming apparatus identified by the device identification information; (d1) determining, based on the residual amount information, whether or not the residual amount of the recording material is equal to or less than a first threshold; (e1) determining whether or not the estimated number of the cartridges is equal to or less than a second threshold; and (f1) in response to affirmative determination made in (d1) and affirmative determination made in (e1), transmitting to the external device via the communication unit an order instruction to deliver a cartridge to the user of the image forming apparatus.

According to another aspect, an automatic cartridge ordering system includes an image forming apparatus, and a server device. The image forming apparatus is configured to form an image on a recording sheet by using recording material. At least one cartridge is connected to the image forming apparatus, and the at least one cartridge contains the recording material. The server device includes a communication unit configured to communicate at least with the image forming apparatus and an external device, a storage unit storing device identification information for identifying the image forming apparatus connected to the communication unit, and control unit. The control unit is configured to perform: (a2) receiving, via the communication unit, residual amount information about residual amount of the recording material remaining in the cartridge connected to the image forming apparatus identified by the device identification information; (b2) acquiring number information about number of the cartridges being delivered; (c2) estimating, based on at least the number information, the number of the cartridges in stock at a user of the image forming apparatus identified by the device identification information; (d2) determining, based on the residual amount information, whether or not the residual amount of the recording material is equal to or less than a first threshold; (e2) determining whether or not the estimated number of the cartridges is equal to or less than a second threshold; and (f2) in response to affirmative determination made in (d2) and affirmative determination made in (e2), transmitting to the external device via the communication unit an order instruction to deliver a cartridge to the user of the image forming apparatus.

BRIEF DESCRIPTION OF THE DRAWINGS

The particular features and advantages of the disclosure will become apparent from the following description taken in connection with the accompanying drawings, in which:

FIG. 2 is a sequence diagram indicating operation of the communication system according to the first embodiment;

FIG. 3 is a schematic diagram of a management table stored in a delivery management server according to the first embodiment;

FIG. 4 is a sequence diagram of the communication system according to the first embodiment;

DETAILED DESCRIPTION

Figure 1:
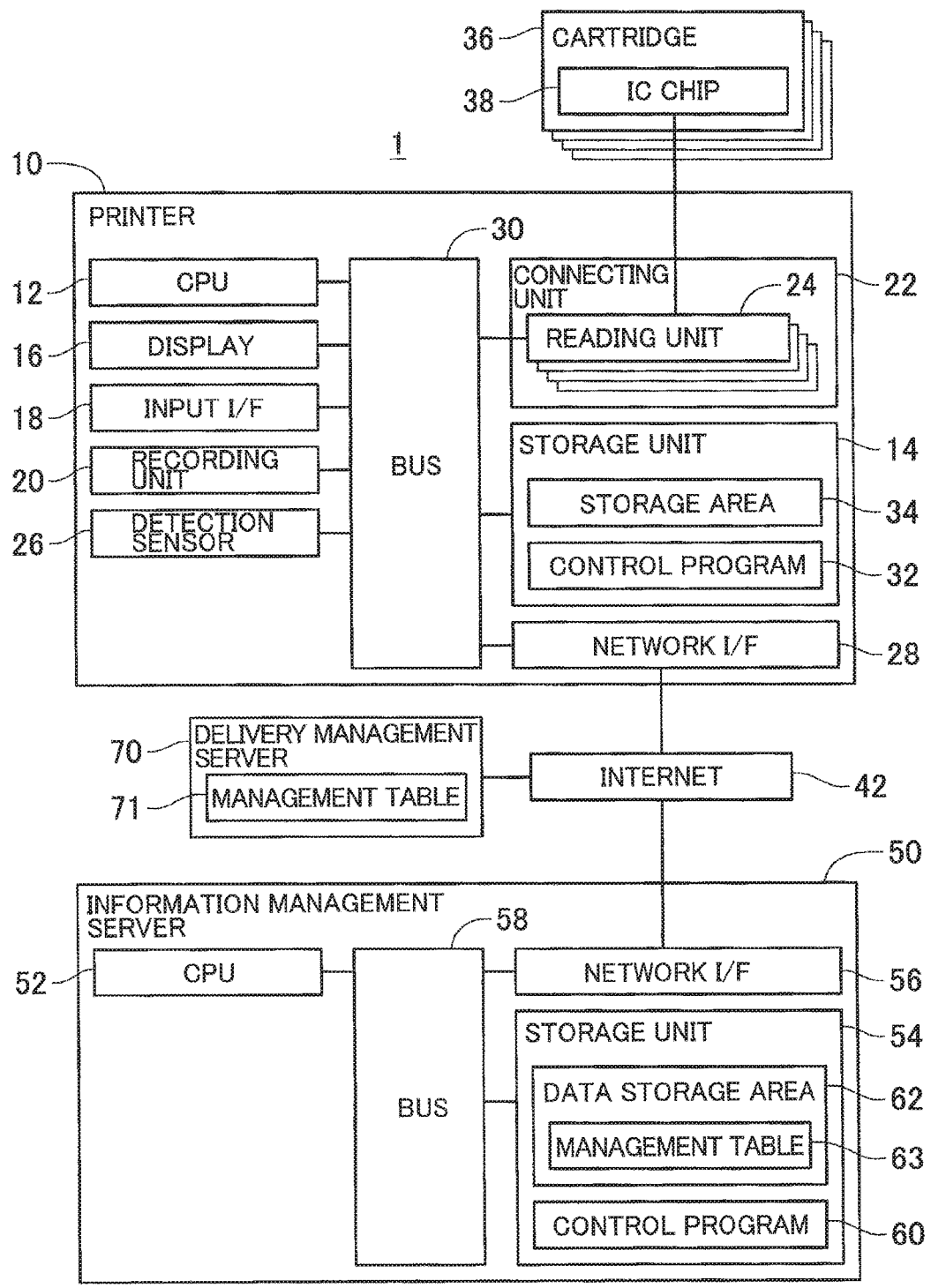
FIG. 1 is a block diagram of a communication system according to a first embodiment.

A Communication system according to a first embodiment will be described while referring to the accompanying drawings wherein like parts and components are designated by the same reference numerals to avoid duplicating description.

<Configuration of Communication System>

FIG. 1 is a block diagram of a communication system 1 exemplified as an embodiment of the present disclosure. The communication system 1 includes a printer 10, an information management server 50, and a delivery management server 70. Printer 10 is an example of an image recording apparatus. Information management server 50 is an example of a server device. The delivery management server 70 is an example of an external device.

The printer 10 mainly includes a CPU (Central Processing Unit) 12, a storage unit 14, a display 16, an input I/F 18, a recording unit 20, a connecting unit 22, a reading unit 24, a detection sensor 26, and a network I/F 28. These components are capable of communicating with each other via a bus 30.

The CPU 12 executes processing in accordance with a control program 32 in the storage unit 14. The control program 32 is a program for managing a residual amount of ink to be used in the printer 10 and purchasing a cartridge 36 using the information management server 50. The storage unit 14 is a combination of a RAM (Random Access Memory), a ROM (Read Only Memory), a flash memory, an HDD (Hard Disk Drive) and a buffer of the CPU 12. Further, the storage unit 14 has a data storage area 34. The data storage area 34 is an area for storing data required to execute the control program 32.

The display 16 displays various screens on the basis of input image data. The display 16 may be, but not limited to, an LCD (Liquid Crystal Display) or an organic EL (Electro Luminescence). The input I/F 18 has keys for a user to execute functions of the printer 10. The input I/F 18 may be, for example, a touch panel integrally formed with the display 16 and receives a user operation for an icon displayed on the display 16. The input I/F 18 may have a hard key instead of the touch panel.

The recording unit 20 serves as a print mechanism and has an inkjet head. The CPU 12 inputs a drive signal to the recording unit 20, causing the inkjet head to eject ink in response to the input drive signal. The recording unit 20 can execute color printing using four-color inks (Black, Yellow, Magenta, and Cyan). The connecting unit 22 is connected to a cartridge 36 filled with ink to be used in the recording unit 20. Cartridges in the four colors are detachably connected to the connecting unit 22. The ink is an example of a recording material.

The cartridge 36 is provided with an IC chip 38 storing specific information for specifying the cartridge 36. The specific information includes two types of information, i.e., a model number of the cartridge 36 and a serial ID as a unique identifier for uniquely identifying the cartridge 36. That is, there may exist two cartridges 36 that have the same model number, i.e. the character strings representing the model number are exactly the same between the two cartridges 36. On the contrary, any two cartridges 36 never have the same serial ID, even if the two cartridges 36 have the same model number. The specific information of one cartridge 36 is therefore unique among other cartridges 36. In the embodiment, the model number is different from each color; in other words, the ink color of the cartridge 36 can be designated by identifying the model number. The reading unit 24 reads the specific information from the IC chip 38 of the cartridge 36 that is connected to the connecting unit 22. The detection sensor 26 detects the residual amount of ink in the cartridge 36 that is connected to the connecting unit 22. Incidentally, the serial ID is an example of cartridge identification information.

The network I/F 28 is capable of communicating with an external device and is connected to Internet 42 via a router, not illustrated. The internet 42 is connected to the information management server 50 and the delivery management server 70. With this configuration, the printer 10 can perform data communication with the information management server 50 via the network I/F 28.

The information management server 50 mainly includes a CPU, a storage unit 54, and a network I/F 56. These components are capable of communicating with each other via a bus 58. The CPU is an example of a control unit and a computer. The network I/F 56 is an example of a communication unit.

The CPU 52 executes processing based on a control program 60 in the storage unit 54. The control program 32 is a program for managing a residual amount of ink used in the printer 10 and purchasing the cartridges 36. Hereinafter, the CPU 52 that executes the control program 60 is also referred to simply by a program name thereof. For example, "control program 60" may represent "CPU 52 that executes the control program 60". The storage unit 54 is a combination of a RAM, a ROM, a flash memory, an HDD, and a buffer of the CPU 52. The storage unit 54 further has a data storage area 62. The data storage area 62 is an area for storing data required to execute the control program 60 and stores a management table 63 illustrated in FIG. 5. The control program 60 is an example of a control program. The data storage area 62 is an example of a storage unit.

The network I/F 56 communicates with an external device, and is connected to the delivery management server 70 on the Internet 42 and the printer 10 via a router, not illustrated. With this configuration, the information management server 50 can perform data communication with the printer 10 and the delivery management server 70 via the network I/F 56. The delivery management server 70 stores a management table 71 illustrated in FIG. 3.

<Management of Ink Utilizing Communication System>

In the communication system 1, the information management server 50 manages ink consumption. When a residual amount of ink used in the printer 10 becomes equal to or less than a threshold amount (example of a first threshold), the information management server 50 transmits, to the delivery management server 70, an order instruction of the cartridge 36 corresponding to this ink. The delivery management server 70 orders the cartridge 36, and the cartridge 36 will be delivered to the user of the printer 10. Accordingly, the user can save time with little effort in the management of purchase and the residual amount of ink in the cartridge 36, and the system 1 can therefore improve user's convenience. However, an ordering unit of the cartridge 36 is four as one set (four cartridges corresponding to four-color inks to be used in the printer 10). That is, four cartridges corresponding to the four-color inks are delivered to the user in accordance with each order. Therefore, cartridges 36 corresponding to ink that is less-frequently used may be stocked at user's hand. Thus, the information management server 50 estimates the number of cartridges 36 in stock at user's hand, and uses the estimated number of the in-stock cartridges 36 to transmit the order instruction of the cartridge 36.

Figure 5:
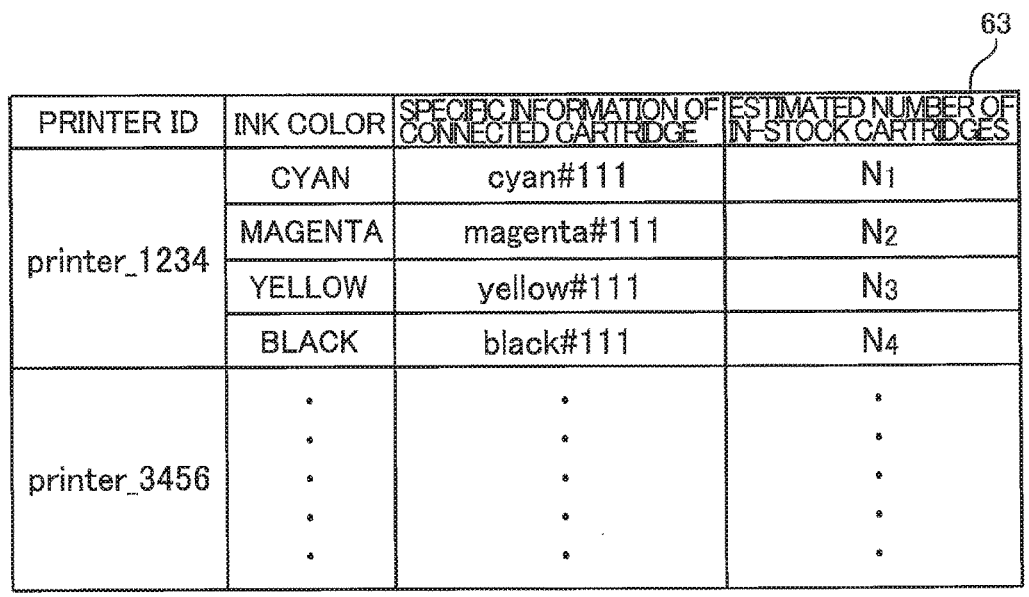
FIG. 5 is a schematic diagram of a management table stored in a data storage area according to the first embodiment.

Specifically, after purchasing the printer 10, the user makes a contract with a predetermined company for an ink management service using the information management server 50. Then, the user connects starter cartridges 36 as one set in the package of the printer 10 to the connecting unit 22, and executes print processing. Further, as illustrated in FIG. 5, in accordance with the contract, a serial ID (hereinafter, also referred to as "printer ID") of the printer 10, which is an object of the contract, is registered in the management table 63 in the data storage area 62 of the information management server 50. Further, as illustrated in FIG. 3, the printer ID and a user ID are registered in correspondence with each other in the management table 71 in the delivery management server 70. The user ID includes an address and a name of a contractor. The serial ID is an example of device identification information.

In the printer 10, when print processing is executed by consuming ink in the cartridge 36 as a starter kit in the package of the printer 10, communication is established between the printer 10 and the information management server 50 (see FIG. 2: M100). Then, in the printer 10, the detection sensor 26 periodically detects the residual amount of ink in each color in the cartridges 36, which are connected to the connecting unit 22. Information of the detected residual amount of ink in each color (hereinafter, also referred to as "ink information") is transmitted from the printer 10 to the information management server 50 (M102). In other words, the ink information includes ink colors and the residual amount of ink in correlation with each ink color. The Information of the detected residual amount of ink or the ink information is an example of residual amount information.

When the detection sensor 26 detects the residual amount of ink, the IC chip 38 of the cartridge 36 connected to the connecting unit 22 is read by the reading unit 24, and the printer 10 acquires the specific information of the cartridge 36. When the ink information is transmitted to the information management server 50, the specific information, the printer ID, and the ink information of the printer 10 are transmitted together to the information management server 50. Specifically, each ink color is transmitted as the ink information, and the specific information of four cartridges 36 corresponding to the four-color inks is transmitted. The ink information, the specific information, and the printer ID that are transmitted to the information management server 50 are also collectively referred to as "printer information", hereinafter.

Upon reception of the printer information, the information management server 50 analyzes the printer information (M104). In the analysis of the printer information, the information management server 50 performs a determination using the specific information in the printer information and another determination employing the ink information in the printer information. More in detail, information management server 50 determines whether the specific information of the connected cartridges 36 received this time (hereinafter referred to as "connected specific information") coincides with the connected specific information received previous time, i.e. the connected specific information in the management table 63. When the connected specific information received this time coincides with the connected specific information received previous time, the information management server 50 determines that the cartridge 36 connected to the connecting unit 22 has not been exchanged. Otherwise, when the connected specific information received this time does not coincide with the connected specific information received previous time, the information management server 50 determines that the cartridge 36 has been exchanged and connected to the connecting unit 22. In the embodiment, the cartridge 36 is in the package of the printer 10 as a starter kit, and connected to the connecting unit 22 of the printer 10. The connected specific information received this time therefore coincides with the connected specific information received previous time, and the information management server 50 determines that the cartridge 36 has not been exchanged.

In the analysis of the printer information, the information management server 50 determines whether an order condition of cartridge 36 is satisfied on the basis of the ink information in the printer information. Specifically, the information management server 50 determines whether the residual amount of ink indicated by the ink information is less than or equal to a threshold amount. When the residual amount of ink indicated by the ink information is more than a threshold amount, the information management server 50 determines that the order condition of the cartridge 36 is not satisfied. Otherwise, when the residual amount of ink indicated by the ink information is equal to or less than a threshold amount, the information management server 50 determines that the order condition is satisfied. In the following explanation, it is assumed that the residual amount of black ink is determined to be equal to or less than a threshold amount.

When it is determined that the order condition is satisfied, the information management server 50 determines whether the cartridge 36 corresponding to the ink information satisfying the order condition (i.e. the cartridge 36 in the same ink color as that of the cartridge 36 satisfying the order condition) is in stock at user's hand (M106). Specifically, the management table 63 stores stock information. The stock information indicates the number of cartridges estimated to be in stock at user's hand of the printer 10. The number of the cartridges 36 estimated to be in stock at user's hand is also referred to as "estimated number of the in-stock cartridges", hereinafter.

As is clear from FIG. 5, the estimated number of the in-stock cartridges is in correlation with the printer ID. Here, the estimated number of the in-stock cartridges is stored for each ink. Each of N1 to N4 of FIG. 5 represents the estimated number of the in-stock cartridges in each ink color, and all the estimated numbers N1 to N4 of the in-stock cartridges are set to zero (0) as a default value. Since the four cartridges corresponding to the four-color inks in the package of the printer 10 are all connected to the connecting unit 22, it is estimated that no cartridge 36 is in stock at user's hand. Therefore, the estimated numbers N1 to N4 of the in-stock cartridges are all zero (0) in the stock information upon determination of M106. The information management server 50 determines that the black ink cartridges 36 that satisfy the order condition are out of stock.

After the determination, the information management server 50 transmits the instruction to order the cartridge 36 to the delivery management server 70 (M108). That is, when the estimated number of the in-stock cartridges 36 in the ink information determined to satisfy the order condition is equal to or less than zero (0) (example of a second threshold), the information management server 50 transmits the instruction to order the cartridge 36 (hereinafter, also referred to as "order instruction"). The order instruction includes the model number of the four-color cartridges 36 (Black, Yellow, Magenta, and Cyan) indicated in the specific information. In addition to the order instruction, the information management server 50 transmits the printer ID to the delivery management server 70, which has been received together with the ink information employed for the determination. Upon reception of the order instruction, the delivery management server 70 performs cartridge 36 ordering processing (M110).

Specifically, as described above, the delivery management server 70 stores the management table 71 in which the printer ID and the user ID are registered in correlation with each other. The delivery management server 70 extracts the user ID from the management table 71 in correlation with the printer ID received together with the order instruction. The delivery management server 70 then outputs to a delivery agent an instruction that instructs to deliver the cartridge 36 to the user identified by the user ID. As described above, the ordering unit of the cartridge 36 in the information management server 50 is four as one set (four cartridges corresponding to four-color inks used in the printer 10). Accordingly, in the ordering processing, the delivery management server 70 transmits the order for four cartridges as one set. Thus, the delivery agent delivers one set of cartridges to the user in accordance with the instruction.

After execution of the cartridge 36 ordering processing, the delivery management server 70 transmits to the information management server 50 information of the number of cartridges 36 delivered in accordance with the ordering processing (M112) (hereinafter, also referred to as "number information"). The delivery management server 70 in the embodiment has ordered one set of cartridges 36, so the number information transmitted to the information management server 50 indicates that the number of cartridges 36 in each ink color is one (1). Upon reception of the number information, the information management server 50 updates the stock information of the management table 63 in accordance with the received number information (M114). That is, the estimated numbers N1 to N4 of the in-stock cartridges of the stock information in the management table 63 are all updated to one (1).

When the black ink is used up, the user of the printer 10 removes a black ink cartridge 36 from the connecting unit 22, and connects a new black ink cartridge 36 in the set of the cartridges to the connecting unit 22. Otherwise, in the printer 10, detection of the residual amount of ink and reading of the specific information are periodically performed, and the printer information is periodically transmitted to the information management server 50 (M116). Then, the information management server 50 that has received the printer information analyzes the printer information.

When the black ink cartridge 36 has been exchanged in the printer 10 as described above, the delivery management server 70 determines that the received specific information of the black ink cartridge 36 does not coincide before and after the reception of the information in the analysis of the printer 10. Thus, the delivery management server 70 determines that the black ink cartridge 36 has been exchanged in the printer 10 (M118). In response to the determination that the exchange has been made, the stock information in the management table 63 is then updated (M120). That is, it is estimated that the number of black ink cartridges 36 in stock has been reduced by one, due to the exchange. Accordingly, the estimated number N4 of the in-stock black ink cartridges 36 in the stock information of the management table 63 becomes zero (0), while the estimated numbers N1 to N3 of the in-stock cartridges 36 of other color inks are maintained at one (1).

Further, there may be a case where the residual amount of the magenta ink is reduced due to the print processing in the printer 10. In such a case, if the printer 10 transmits the printer information to the information management server 50 (M122), the information management server 50 analyzes the printer information to determine that the residual amount of ink is equal to or less than a threshold amount (M124) on the basis of the ink information of the magenta in the printer information. That is, it is determined that the magenta ink cartridge 36 satisfies the order condition.

Then, presence/absence of the in-stock magenta ink cartridge 36 is determined on the basis of the stock information in the management table 63 (M126). As described above, upon determination of M126, the estimated number N4 of in-stock black ink cartridges 36 is changed to zero in the stock information, while the estimated numbers N1 to N3 of the in-stock cartridges 36 in other ink colors are one (1). That is, in M126, it is determined that one magenta ink cartridge 36 is in stock at user's hand.

When a cartridge 36 is ordered in a case where another cartridge 36 that satisfies the order condition is in stock at user's hand, the number of the cartridges 36 at user's hand is not reduced, resulting in extra stock. Considering this, in the case where the cartridge 36 that satisfies the order condition is in stock at user's hand, the information management server 50 does not transmit the order instruction (M128). This can reduce the number of the cartridges 36 in stock at user's hand.

Further, there may be a case where the residual amount of the black ink is consumed once again due to the print processing in the printer 10. In such a case, if the printer 10 transmits the printer information to the information management server 50 (see FIG. 4: M130), the information management server 50 analyzes the printer information to determine that the residual amount of the black ink is equal to or less than a threshold amount (M132) on the basis of the ink information of the black ink in the printer information. That is, it is determined that the black ink cartridge 36 satisfies the order condition.

Then, presence/absence of the in-stock black ink cartridges 36 is determined on the basis of the stock information in the management table 63 (M134). As described above, upon determination of M134, the estimated number $N_4$ of in-stock black ink cartridges 36 is zero (0) in the stock information. Meanwhile, the estimated numbers $N_1$ to $N_3$ of the in-stock cartridges 36 in other ink colors are one (1). That is, it is determined in M134 that black ink cartridge 36 is out of stock at user's hand. Therefore, it is necessary to place an order for delivery of the black ink cartridge 36.

Here, the estimated numbers $N_1$ to $N_3$ of the in-stock cartridges 36 of inks other than black are one (1), so that it is estimated that the three cartridges 36 in three ink colors other than black are in stock. When one set of the cartridges 36 is ordered in this case, the number of the in-stock cartridges 36 in the three ink colors other than black is incremented, resulting in extra stock.

In order to suppress the extra stock, the information management server 50 uses the following methods. In the case where a cartridge 36 in one ink color satisfying the order condition is out of stock but cartridges 36 in another ink color are in stock at user's hand, the information management server 50 makes an inquiry via the printer 10 about change in the ordering unit of the cartridges 36. In other words, when the estimated number of the in-stock cartridges 36 in one ink color determined to satisfy the order condition is equal to or less than zero (0) and another estimated number of the in-stock cartridges 36 in another ink color is not less than one (1) in the ink information (example of a third threshold), the information management server 50 makes an inquiry via the printer 10 about change in the ordering unit.

Specifically, in the case where the cartridge 36 in one ink color that satisfies the order condition is out of stock at user's hand but any one of the cartridges 36 in other ink colors is in stock at user's hand, the information management server 50 transmits an instruction to the printer 10 to display an order number change screen (M136). Upon reception of the order number change screen, the printer 10 display the order number change screen on the display 16 in accordance with the instruction (M138). On the order number change screen, a button for ordering the cartridge 36 on a per set basis and another button for ordering the cartridge 36 on one-by-one basis (on a per color basis) are displayed. Then the user operates one of the buttons (M140).

In response to the user's button operation, the printer 10 transmits operation information based on the button operation to the information management server 50 (M142). Upon reception of the operation information, the information management server 50 analyzes the received operation information (M144) and makes an order in accordance with the operation information. That is, when the operation information indicates the button operation for ordering the cartridges 36 on a per set basis, the information management server 50 transmits the order instruction to the delivery management server 70 for ordering the cartridges 36 as a set (M146), similarly to M 108. Otherwise, when the operation information indicates the button operation for ordering cartridges 36 on a one-by-one basis, the information management server 50 transmits the order instruction to the delivery management server 70 for ordering the cartridges 36 on a one-by-one basis. That is, the information management server 50 transmits the order instruction to order the black ink cartridge 36 (M148). Specifically, the order instruction designates the model number of the black cartridges 36 in the printer information, which has already been received by the information management server 50, whereby the black ink cartridge 36 is ordered. Accordingly, an increase in the stock of the cartridges 36 can be prevented in accordance with user's intention.

<Control Program>

The ink management processing and the ordering processing for cartridge 36 described above are performed upon execution of the control program 60 by the CPU 52 in the information management server 50. Hereinafter, a processing flow for execution of the control program 60 will be described using FIGS. 6 and 7.

Figure 6:
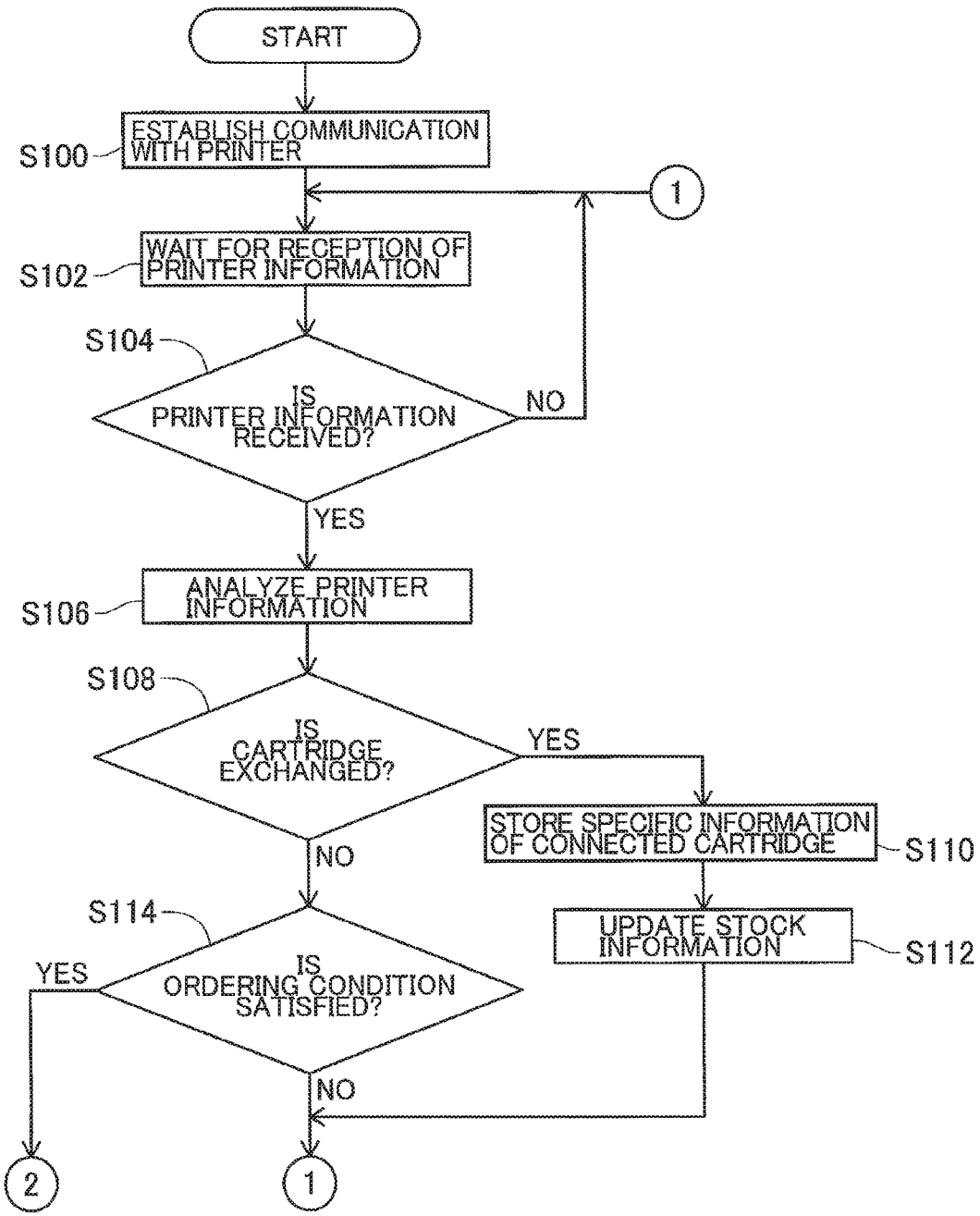
FIG. 6 is a workflow of an information management server according to the first embodiment.
Figure 7:
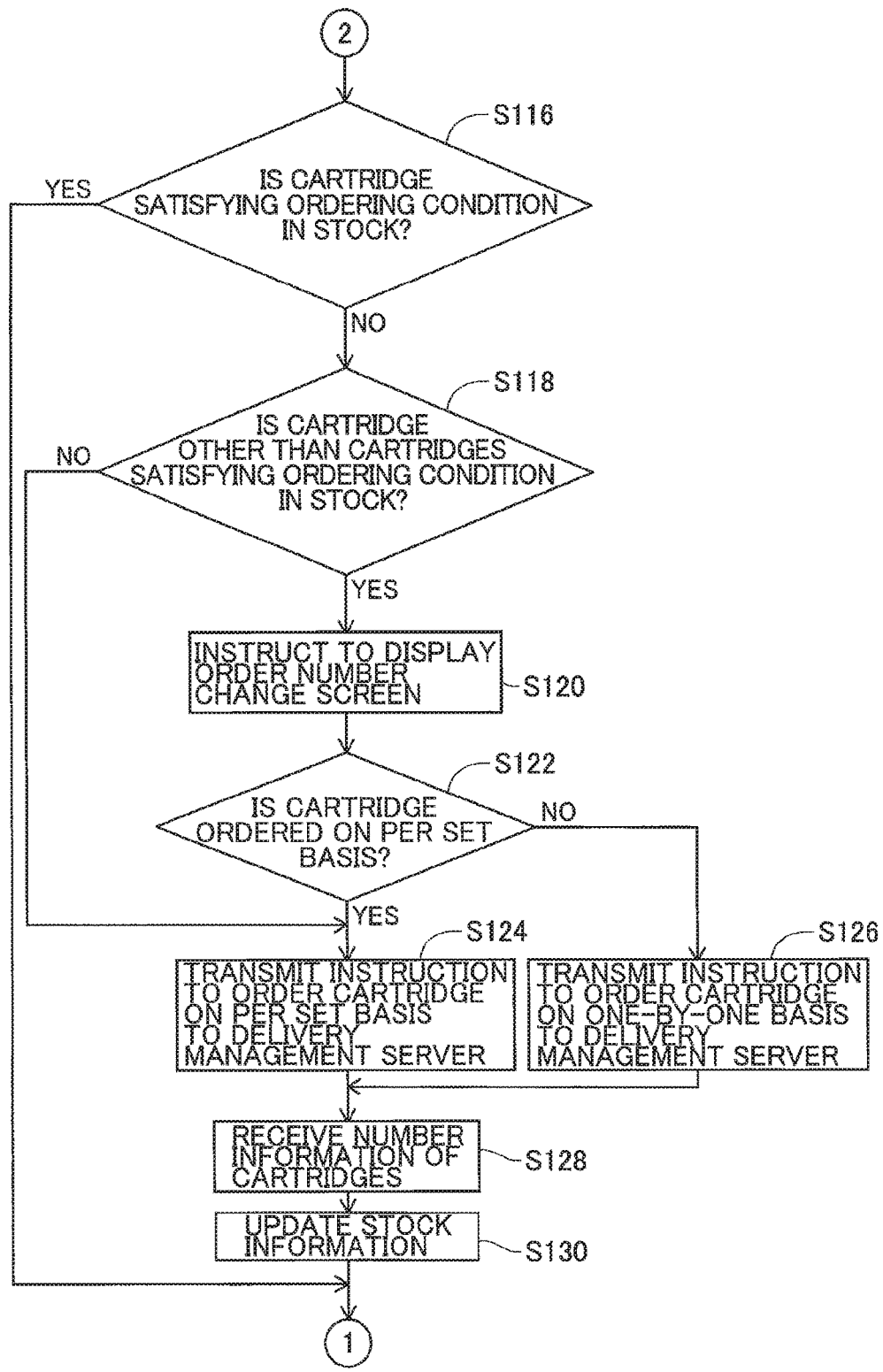
FIG. 7 is a workflow of the information management server according to the first embodiment.

As illustrated in FIG. 6, when the control program 60 is executed by the CPU 52, communication is established between the printer 10 and the information management server 50 (S100). Then, the information management server 50 waits for reception of the printer information from the printer 10 (S102). Then, the CPU 52 determines whether the printer information has been received from the printer 10 (S104). When it is determined that the printer information has not been received (NO in S104), the processing flow returns to S102. Otherwise, when it is determined that the printer information has been received (YES in S104), the received printer information is analyzed (S106).

On the basis of the specific information in the printer information, the CPU 52 then determines whether the cartridge 36 connected to the connecting unit 22 has been exchanged (S108). When it is determined that the cartridge 36 has been exchanged (YES in S108), the specific information in the printer information received in S104 is stored in the management table 63 (S110). Then, in response to the exchange of the cartridge 36, the stock information in the management table 63 is updated (S112). That is, one (1) is subtracted from the estimated number of the in-stock cartridges 36 that has been exchanged, and the resultant estimated number of the in-stock cartridges 36 is stored in the management table 63 as the stock information. Then, the processing flow returns to S102.

Otherwise, on the basis of the ink information in the received printer information, when it is determined in S108 that the cartridge 36 has not been exchanged (NO in S108), the CPU 52 determines whether the order condition of the cartridge 36 is satisfied. That is, the CPU 52 determines whether the residual amount of ink indicated by the ink information is equal to or less than a threshold amount (S114). When it is determined that the residual amount of ink indicated by the ink information is more than a threshold amount (NO in S114), the processing flow returns to S102. Otherwise, when it is determined that the residual amount of ink indicated by the ink information is equal to or less than a threshold amount (YES in S114), the CPU 52 examines the presence of the in-stock cartridge 36 that satisfies the order condition (S116). That is, the CPU 52 determines, by referring to the stock information in the management table 63, whether the estimated number of the in-stock cartridges 36 that satisfy the order condition is zero (0).

When any cartridge 36 that satisfies the order condition is in stock (YES in S116), that is, when the estimated number of the in-stock cartridges 36 that satisfy the order condition is not zero (0), the processing flow returns to S102. Otherwise, when any cartridge 36 that satisfies the order condition is out of stock (NO in S116), that is, when the estimated number of the in-stock cartridges 36 that satisfy the order condition is zero (0), the CPU 52 examines the presence of the in-stock cartridge 36 of a different ink color from the cartridge 36 that satisfies the order condition (S118). That is, the CPU 52 determines, by referring to the stock information in the management table 63, whether the estimated number of the in-stock cartridges 36 in ink colors different from the ink color of the cartridge 36 that satisfies the order condition is equal to or more than one (1).

Then, when any cartridge 36 in a different ink color from the cartridge 36 that satisfies the order condition is in stock (YES in S118), the information management server 50 transmits an instruction to the printer 10 for displaying the order number change screen (S120). That is, when the estimated number of the in-stock cartridges 36 other than the cartridge 36 that satisfies the order condition is equal to or more than one (1), the information management server 50 transmits an instruction to the printer 10 for displaying the order number change screen (S120). Then, the information management server 50 receives the operation information from the printer 10 and determines whether the operation information indicates that the cartridges 36 are ordered on a per set basis (S122).

When the operation information indicates that the cartridges 36 are ordered on a per set basis (YES in S122), the information management server 50 transmits the instruction to order the cartridges 36 on a per set basis to the delivery management server 70 (S124). Then, the processing flow proceeds to S128. Otherwise, when the operation information does not indicate that the cartridges 36 are ordered on a per set basis (NO in S122), that is, when the operation information indicates that the cartridges 36 are ordered on a one-by-one basis, the information management server 50 transmits, to the delivery management server 70, the instruction to order the cartridges 36 on a one-by-one basis (S126). Then, the processing flow proceeds to S128.

In S128, the information management server 50 receives the number information from the delivery management server 70 as a reply to the order instruction (S128). Upon reception of the number information, the information management server 50 updates the stock information in the management table 63 in accordance with the received number information (S130). That is, one (1) is added to the estimated number of the in-stock cartridges 36 in the number information, and the resultant estimated number of the in-stock cartridges 36 is in the management table 63 as the stock information. Then the processing flow returns to S102.

The CPU 52 executing S104 is an example of a receiving unit. The CPU 52 executing S112 and S130 is an example of a predicting unit. The CPU 52 executing S114 is an example of a first determining unit. The CPU 52 executing S118 is an example of a second determining unit. The CPU 52 executing S120 is an example of a third transmitting unit. The CPU 52 executing S124 and S126 is an example of a first transmitting unit. The CPU 52 executing S128 is an example of an acquiring unit and a second receiving unit.

Second Embodiment

Figure 8:
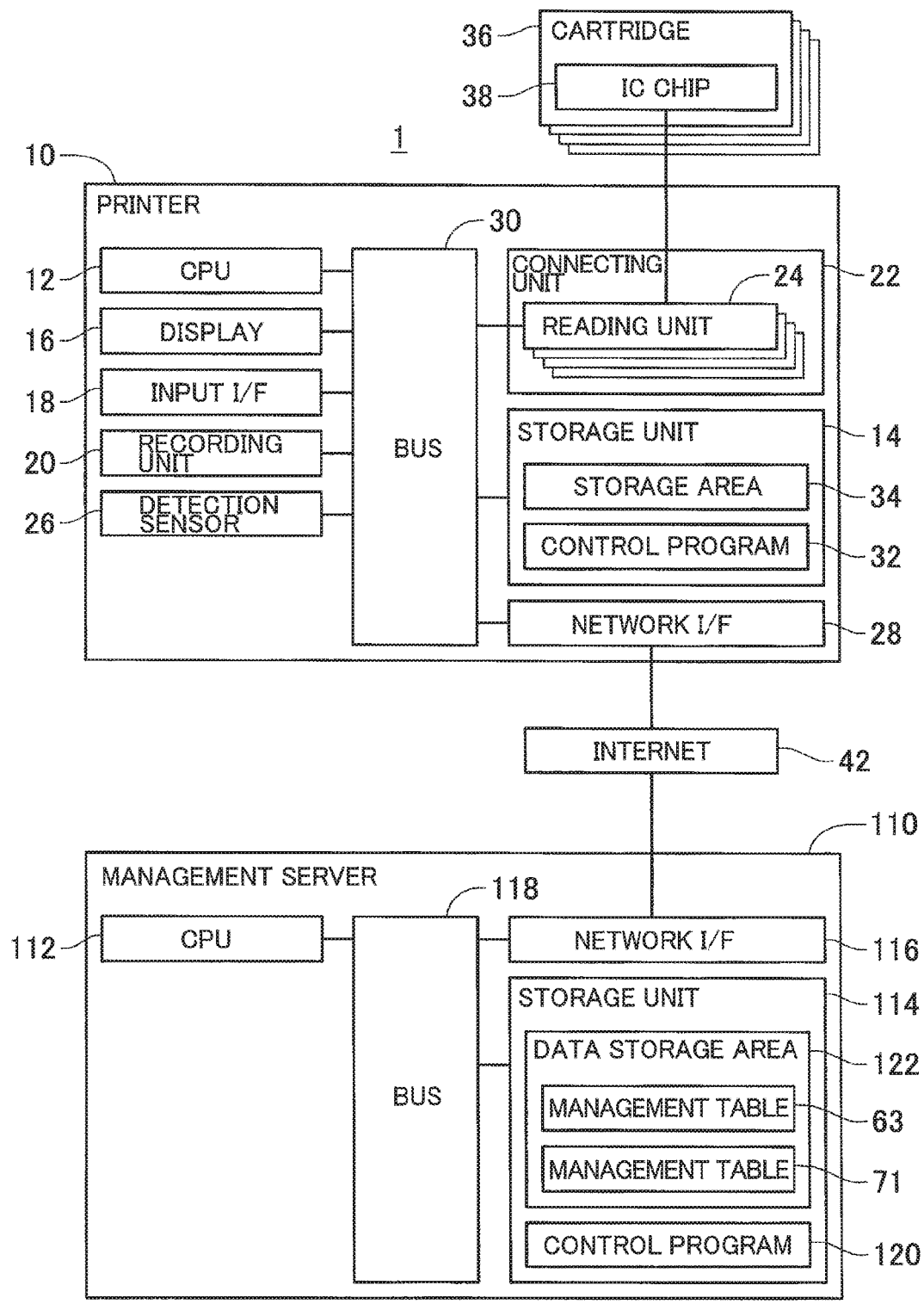
FIG. 8 is a block diagram of a communication system according to a second embodiment.

As illustrated in FIG. 8, a communication system 100 according to a second embodiment includes a printer 10 and a management server 110. A printer 10 of the second embodiment has the same configuration as that of the first embodiment, so description thereof will be omitted. The management server 110 of the second embodiment mainly includes a CPU 112, a storage unit 114, a network I/F 116. These components are made communicable via a bus 118. The CPU 112, the storage unit 114, the network I/F 116, and the bus 118 have the same configurations as those of the CPU 52, the storage unit 54, the network I/F 56, and the bus 58 of the information management server 50 of the first embodiment, so description thereof will be omitted. The management server 110 is an example of a server device. The CPU 112 is an example of a control unit and a computer. The network I/F 116 is an example of a communication unit.

The management server 110 of the second embodiment is a server having a configuration obtained by integrating the information management server 50 and the delivery management server 70. That is, as in the information management server 50 of the first embodiment, the management server 110 receives the printer information from the printer 10 and determines, based on the ink information in the received printer information, whether the order condition of the cartridge 36 is satisfied. Further, as in the information management server 50, the management server 110 examines the presence of the in-stock cartridge 36 that satisfies the order condition. Thus, the management table 63 of the first embodiment is stored in a data storage area 122 of the management server 110. Further, as in the delivery management server 70 of the first embodiment, the management server 110 issues the delivery instruction to the delivery agent. Thus, the management table 71 is also stored in the data storage area 122. The data storage area 122 is an example of a storage unit.

Also in the communication system 100 of the second embodiment with the above configuration, the same ink management service as that in the communication system 1 of the first embodiment is performed. In the first embodiment, the cartridge 36 is not ordered when the cartridge 36 that satisfies the order condition is in stock. Meanwhile, the cartridge 36 according to the second embodiment may be ordered in accordance with intention of a user of the printer 10 even when the cartridge 36 that satisfies the order condition is in stock.

Specifically, as in the communication system 1 of the first embodiment, in the communication system 100 of the second embodiment, the user purchases the printer 10 and then makes a contract with a predetermined company for an ink management service using the management server 110. Then, the user connects a set of four cartridges 36 corresponding to four-color inks in the package of the printer 10 to the connecting unit 22, and executes print processing by the printer 10.

Figure 9:
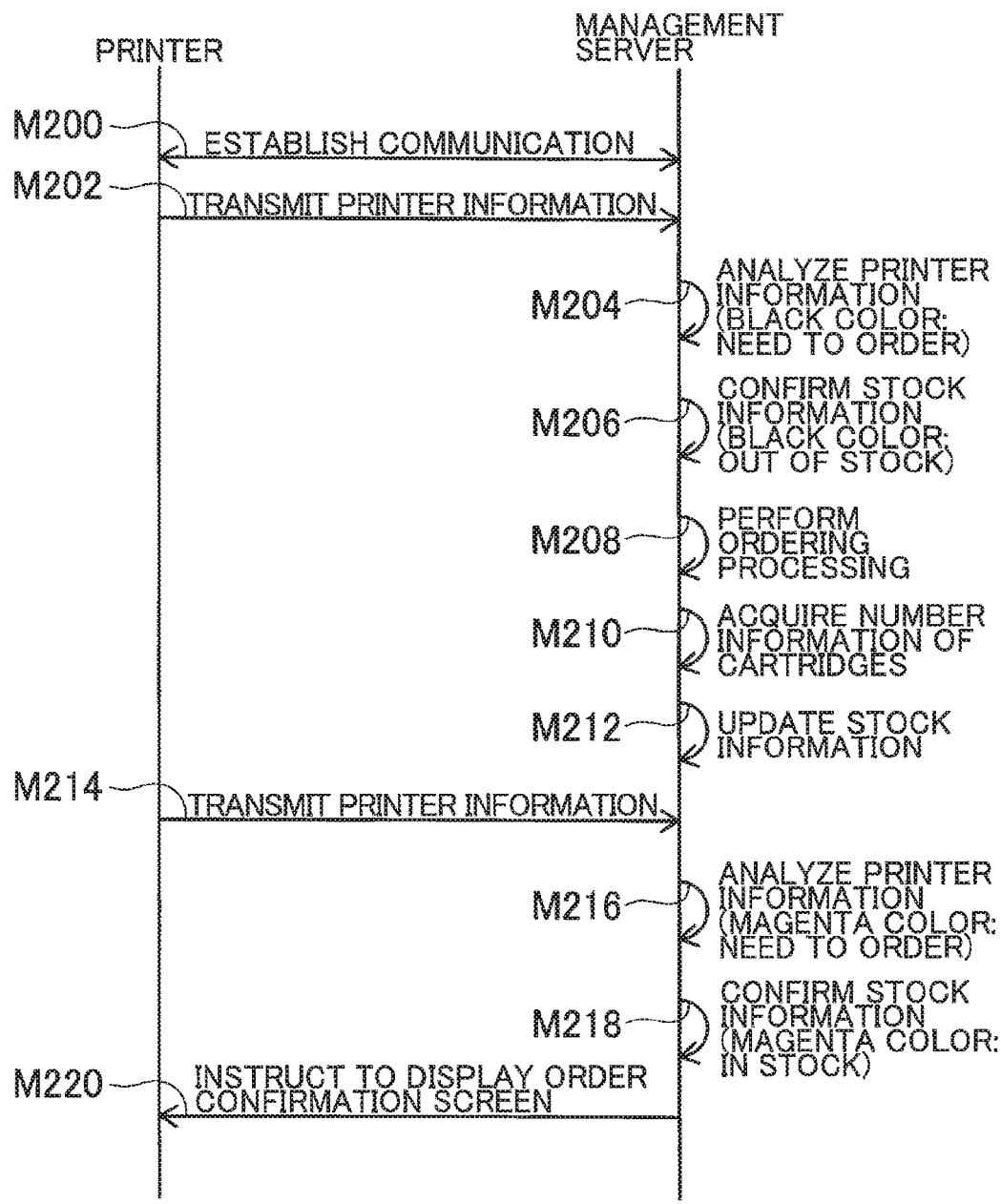
FIG. 9 is a sequence diagram indicating operation of the communication system according to the second embodiment.
Figure 10:
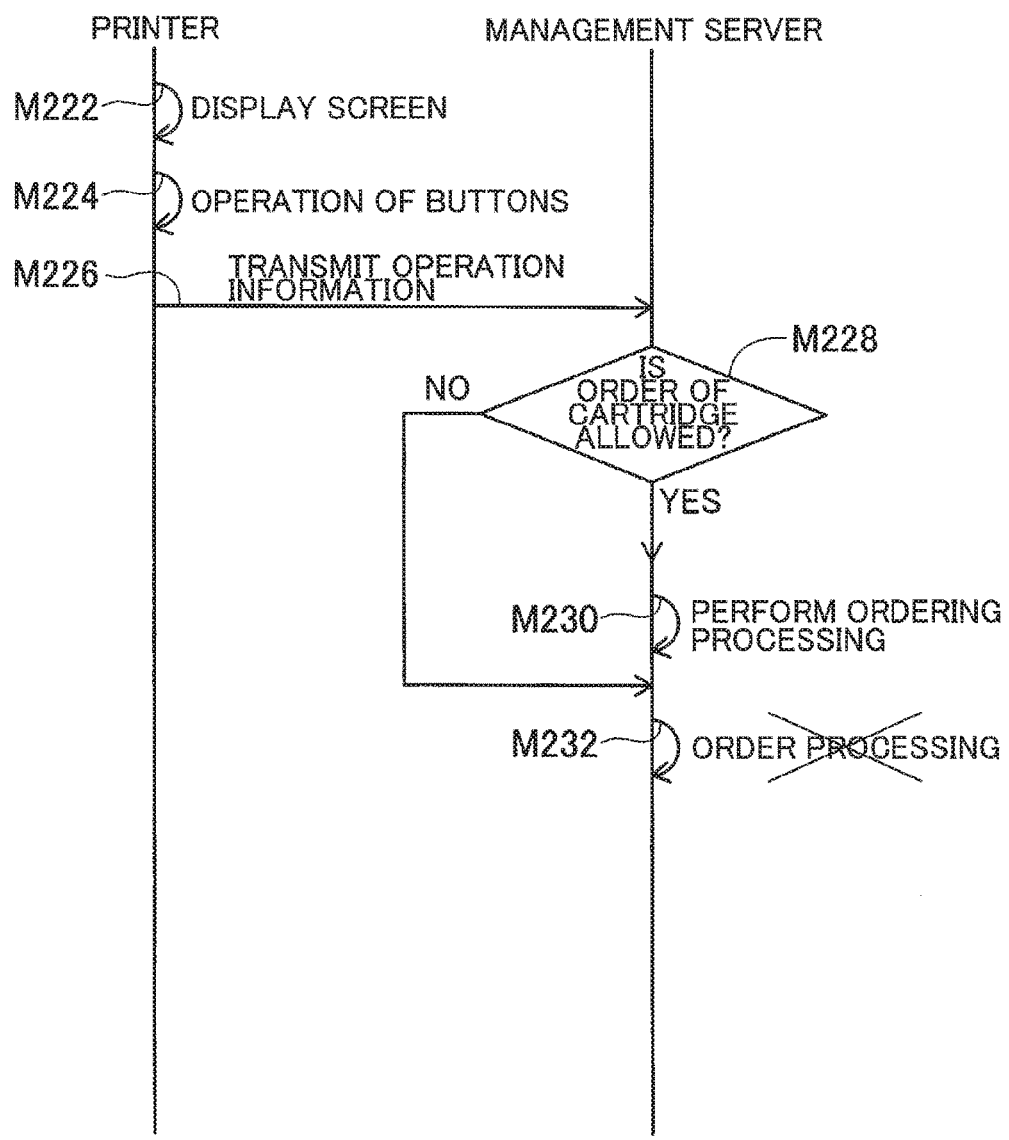
FIG. 10 is a sequence diagram indicating operation of the communication system according to the second embodiment.

At this time, communication is established between the printer 10 and the management server 110 (see FIG. 9: M200). Then, processing from M202 to M206 is executed. The processing of M202 to M206 is the same as the processing of M102 to M106 in the first embodiment, so description thereof will be omitted. After completion of M206, the management server 110 performs ordering processing (M208) of the cartridge 36.

Specifically, the management table 71 in which the printer ID and the user ID are registered in correlation with each other is stored in the data storage area 122, as described above. The management server 110 extracts the user ID registered in the management table 71 in correlation with the printer ID in the printer information. The management server 110 then transmits an instruction to an external device managed by a delivery agent. The instruction instructs to deliver the cartridge 36 to the user specified by the user ID. As in the first embodiment, the ordering unit of the cartridge 36 in the management server 110 is four as one set (four cartridges 36 corresponding to four-color inks used in the printer 10). Accordingly, the instruction includes the model numbers for the cartridges 36 in the four ink colors (black, cyan, magenta, and yellow) indicated in the specific information of the printer information. The external device is an example of an external device.

After execution of the cartridge 36 ordering processing, the management server 110 acquires information of the number of cartridges 36 delivered by the ordering processing, i.e. number information (M210). That is, the information management server 50 of the first embodiment acquires the number information from the delivery management server 70; meanwhile, the management server 110 acquires the number information by internal processing of the management server 110. Then, as in the information management server 50 of the first embodiment, the management server 110 updates the stock information of the management table 63 in accordance with the acquired number information (M212).

There may be a case where the residual amount of a magenta ink cartridge 36 is consumed by the print processing in the printer 10. In this case, when the printer 10 transmits the printer information to the management server 110 (M214), the management server 110 analyzes the printer information on the basis of the ink information of the magenta ink in the printer information to determine that the residual amount of ink is equal to or less than a threshold amount (M216). Then, presence/absence of the in-stock magenta ink cartridge 36 is examined on the basis of the stock information in the management table 63 (M218). At this time, as in M126 of the first embodiment, it is determined that one magenta ink cartridge 36 is in stock at user's hand.

As described above, when the cartridge 36 that satisfies the order condition is in stock, the information management server 50 of the first embodiment does not order the cartridge. On the other hand, the management server 110 according to the second embodiment transmits am instruction to the printer 10 to display an order confirmation screen (M220). Upon reception of the instruction, the printer 10 displays the order confirmation screen on the display 16 in accordance with the received instruction (M222). On the order confirmation screen, a button to allow the order of the cartridge 36 and a button to disallow the order of the cartridge 36 are displayed. Then the user operates one of the buttons (M224).

In response to the user's button operation, the printer 10 transmits operation information based on the button operation to the management server 110 (M226). Upon reception of the operation information, the management server 110 analyzes the received operation information (M228). At this time, when the operation information indicates the button operation for allowing the order of the cartridge, the management server 110 executes the ordering processing of the cartridge 36 (M230) by designating the model number of the magenta ink cartridge 36 in the specific information of the printer information received in M214. Otherwise, when the operation information indicates the button operation for disallowing the order of the cartridge, the management server 110 does not execute the cartridge 36 ordering processing (M232). Thus, permission and rejection of the ordering processing of the cartridge 36 can be optionally determined in accordance with the user's intention.

Figure 11:
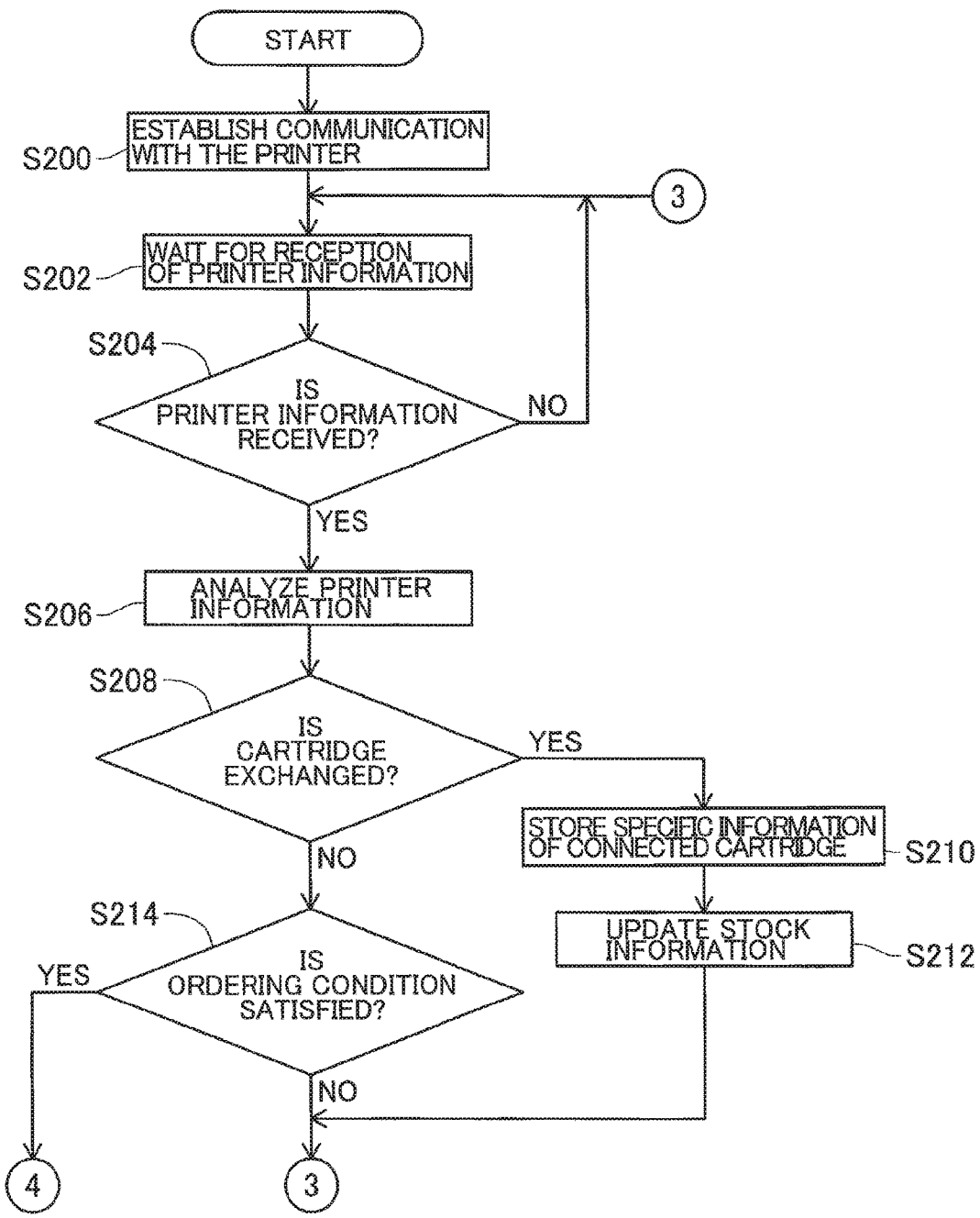
FIG. 11 is a workflow of a management server according to the second embodiment.
Figure 12:
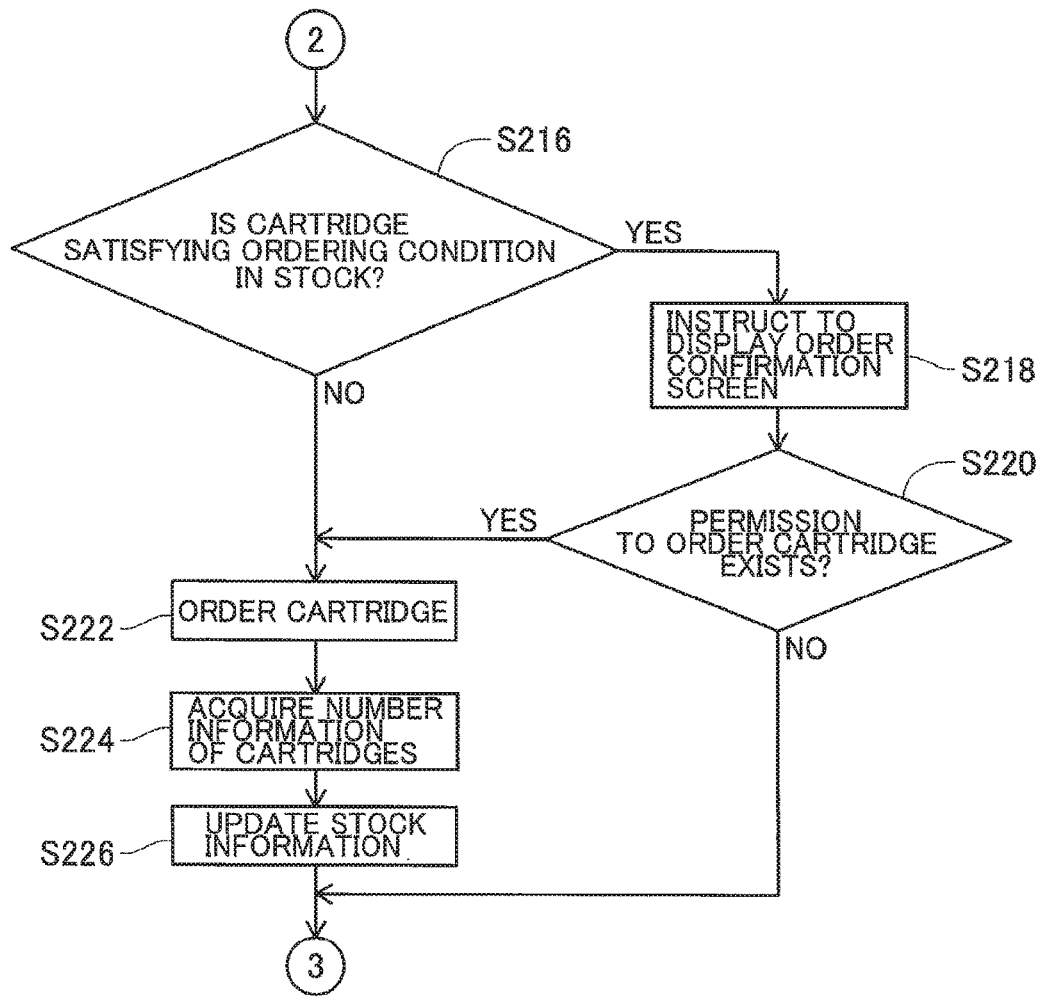
FIG. 12 is a workflow of the management server according to the second embodiment.

The processing in the management server 110 of the second embodiment is performed upon execution of a control program 120 by the CPU 112 of the management server 110. Hereinafter, a processing flow upon execution of the control program 120 will be described using FIGS. 11 and 12. However, the processing flow executed by the CPU 112 is partly the same as that executed by the CPU 52 of the information management server 50 of the first embodiment, so description of the same part will be simplified. The control program 120 is an example of a control program.

When the control program 120 is executed by the CPU 112, processing of S200 to S216 are executed. The processing of S200 to S216 are the same as the processing of S100 to S116 of FIGS. 6 and 7, so description thereof will be omitted. When it is determined in S216 that the cartridge 36 that satisfies the order condition is in stock (YES in S216), the management server 110 transmits to the printer 10 the instruction to display the order confirmation screen (S218). Then, the management server 110 receives the operation information from the printer 10 and determines whether the operation information indicates the permission to order the cartridge 36 (S220).

When determining that the operation information indicates that the order of the cartridge 36 is allowed (YES in S220), the management server 110 executes the cartridge 36 ordering processing (S222). Then, the management server 110 acquires the number information (S224) and updates the stock information in the management table 63 in accordance with the received number information (S226). Then, the processing flow returns to S202. Otherwise, when it is determined that the operation information indicates that the order of the cartridge 36 is disallowed (NO in S220), the processing of S222 to S226 are skipped and the processing flow returns to S202.

The CPU 112 executing S204 is an example of a receiving unit. The CPU 112 executing S212 and S226 is an example of a predicting unit. The CPU 112 executing S214 is an example of a first determining unit. The CPU 112 executing S218 is an example of a second transmitting unit. The CPU 112 executing S222 is an example of a first transmitting unit. The CPU 112 executing S224 is an example of an acquiring unit and a second receiving unit.

While the description has been made in detail with reference to specific embodiments thereof, it would be apparent to those skilled in the art that various changes and modifications may be made therein without departing from the spirit and scope of the above described embodiments.

Specifically, in the above description, the printer 10 periodically transmits the ink information to the information management server 50; alternatively, the printer 10 may transmit the ink information at a predetermined timing. For example, the ink information may be transmitted to the information management server 50 at a timing when the residual amount of ink of the cartridge 36 is reduced to a predetermined amount. Further, in the above description, the printer 10 detects the residual amount of ink by means of the detection sensor 26; alternatively, the printer 10 may detect the residual amount by a calculation. Specifically, the printer 10 calculates the ink amount consumed in the print processing on the basis of image data and print settings, and then subtracts the calculated amount of ink from the current residual amount of ink.

Further, in the above description, the recording unit 20 is an inkjet type; alternatively, the recording unit 20 may be an electrophotographic type. In this case, the cartridge 36 is filled with toner, in place of the ink.

Further, in the above description, the printer 10 is a color printer; alternatively, the printer 10 may be a monochrome printer. In this case, only a single cartridge 36 can be connected to the connecting unit 22.

Further, in the above description, the information management server 50 and the printer 10 directly exchange data such as the printer information; alternatively, they may indirectly exchange the data via a PC. Specifically, data exchange can be performed between the printer 10 connected to the PC by a USB cable, a LAN, or a wireless LAN and the information management server 50 via the PC.

Further, in the above description, the information management server 50 transmits, to the delivery management server 70, the printer ID together with the order instruction of the cartridge 36, and the delivery management server 70 specifies the user ID based on the printer ID; alternatively, the information management server 50 may transmit information different from the printer ID, and the delivery management server 70 may specify the user ID based on the information.

Further, in the above description, determination of whether the cartridge 36 has been exchanged is based on the specific information in the printer information. Alternatively, the determination may be based on the ink information in the printer information. Specifically, when the residual amount of ink indicated by the ink information received in N-th round is more than the residual amount of ink indicated by the ink information received in (N−1)th round, it can be determined that exchange of the cartridge 36 has been made.

Further, in the above description, the information management server 50 is constituted of a single web server; alternatively, it may be constituted of a plurality of web servers.

Further, in the above description, the CPU 52 or the like executes processing of FIGS. 6, 7, 11, and 12; alternatively, these processing may be executed by the CPU 52, an ASIC, or another logic integrated circuit or may be executed by cooperation of the CPU 52, ASIC, or another logic integrated circuit.

What is claimed is:

1. A server device comprising:
   a communication interface configured to communicate at least with an external device;
   a memory storing device identification information for identifying an image forming apparatus communicable with the server device via the communication interface, the image forming apparatus being configured to form an image on a recording sheet using recording material, the recording material being contained in a cartridge attachable to and detachable from the image forming apparatus; and
   a controller configured to perform:
      receiving, via the communication interface, residual amount information about a residual amount of the recording material remaining in the cartridge connected to the image forming apparatus identified by the device identification information;
      comparing currently acquired residual amount information with previously acquired residual amount information;
      estimating a number of cartridges in stock at a user of the image forming apparatus identified by the device identification information, wherein the estimating includes specifying that the number of cartridges in stock at the user has been decremented by one in a case where the residual amount indicated by the currently acquired residual amount information is greater than the residual amount indicated by the previously acquired residual amount information;
      determining, based on the residual amount information, whether or not the residual amount of the recording material is equal to or less than a first threshold;
      determining whether or not the estimated number of cartridges is equal to or less than a second threshold; and
      in a case where (1) the residual amount of the recording material is equal to or less than a first threshold and (2) the estimated number of cartridges is equal to or less than a second threshold, transmitting to the external device via the communication interface an order instruction to deliver a cartridge to the user of the image forming apparatus.

2. The server device according to claim 1, wherein number information representing a number of cartridges delivered in response to the order instruction is acquired from the external device via the communication interface.

3. The server device according to claim 2, wherein the external device transmits the number information in response to receipt of the order instruction.

4. The server device according to claim 1, wherein the controller is configured to further perform:
   in a case where the residual amount of the recording material is equal to or less than the first threshold and the estimated number of the cartridges is greater than the second threshold, requesting permission to order the cartridge via the communication interface.

5. The server device according to claim 4, wherein the controller is configured to perform:
   transmitting the order instruction irrespective of the estimated number of cartridges, when receiving the permission via the communication interface.

6. The server device according to claim 1, wherein the controller is configured to further perform:
   receiving, from the external device via the communication interface, a notification indicating that the cartridge has been delivered in accordance with the order instruction; and
   in response to receipt of the notification, incrementing the estimated number of cartridges by the number of cartridges indicated in number information representing a number of cartridges delivered.

7. The server device according to claim 1, wherein the controller is configured to further perform:
   decrementing the estimated number of the cartridges by one in response to a comparison result obtained by the comparing indicating that the residual amount of the recording material in the currently acquired residual amount information is greater than the residual amount of the recording material in the previously acquired residual amount information.

8. The server device according to claim 1, wherein the controller is configured to further perform:
   receiving via the communication interface cartridge identification information for identifying the cartridge connected to the image forming apparatus; and
   determining whether or not currently received cartridge identification information is in coincidence with previously received cartridge identification information; and
   in response to determining that the currently received cartridge identification information is inconsistent with the previously received cartridge identification information, decrementing the estimated number of the cartridges by one.

9. The server device according to claim 1, wherein the image forming apparatus comprises a connecting unit which a plurality of cartridges are connectable to and detachable from, the plurality of cartridges containing different color recording material; and
   wherein the controller is configured to perform:
      estimating the number of the cartridges in stock at the user in each color;
      transmitting to the external device via the communication interface the order instruction to deliver at once to the user the plurality of cartridges each containing the recording material in one of a first color and a second color different from the first color;

when the residual amount of the recording material in the first color is equal to or less than the first threshold and the estimated number of the cartridges containing the recording material in the first color is equal to or less than the second threshold, determining whether or not the estimated number of the cartridges containing the recording material in the second color is equal to or greater than a third threshold; and when the estimated number of the cartridges containing the recording material in the second color is equal to or greater than the third threshold, transmitting via the communication interface an inquiry about changing a quantity of the cartridges to be delivered in accordance with the order instruction.

10. The server device according to claim 1, wherein the controller is configured to further perform:

estimating that the number of the cartridges in stock at the user is zero before transmitting the order instruction for a first time.

11. A server device comprising:

a communication interface configured to communicate at least with an external device;

a memory storing device identification information for identifying an image forming apparatus communicable with the server device via the communication interface, the image forming apparatus being configured to form an image on a recording sheet using recording material, the recording material being contained in a cartridge attachable to and detachable from the image forming apparatus; and a controller configured to perform:

receiving, via the communication interface, residual amount information about residual amount of the recording material remaining in the cartridge connected to the image forming apparatus identified by the device identification information;

receiving, via the communication interface, cartridge identification information for identifying the cartridge connected to the image forming apparatus;

determining whether currently received cartridge identification information is in coincidence with previously received identification information;

estimating a number of the cartridges in stock at a user of the image forming apparatus identified by the device identification information, wherein the estimating includes specifying that the number of the cartridges in stock at the user has been decremented by one in a case where the currently received cartridge identification information is inconsistent with the previously received cartridge identification information;

determining, based on the residual amount information, whether or not the residual amount of the recording material is equal to or less than a first threshold;

determining whether or not the estimated number of the cartridges is equal to or less than a second threshold; and in a case where (1) the residual amount of the recording material is equal to or less than a first threshold and (2) the estimated number of the cartridges is equal to or less than a second threshold, transmitting to the external device via the communication interface an order instruction to deliver a cartridge to the user of the image forming apparatus.

12. The server device according to claim 11, wherein number information representing a number of cartridges delivered in response to the order instruction is acquired from the external device via the communication interface.

13. The server device according to claim 12, wherein the external device transmits the number information in response to receipt of the order instruction.

14. The server device according to claim 11, wherein the controller is configured to further perform:

in a case where the residual amount of the recording material is equal to or less than the first threshold and the estimated number of the cartridges is greater than the second threshold, requesting a permission for ordering the cartridge via the communication interface.

15. The server device according to claim 14, wherein the controller is configured to perform:

transmitting the order instruction irrespective of the estimated number of the cartridges, when receiving the permission via the communication interface.

16. The server device according to claim 11, wherein the controller is configured to further perform:

receiving, from the external device via the communication interface, notification indicating that the cartridge has been delivered in accordance with the order instruction; and in response to receipt of the notification, incrementing the estimated number of the cartridges by the number of the cartridges indicated in number information representing a number of cartridges delivered.

17. The server device according to claim 11, wherein the controller is configured to further perform:

comparing currently acquired residual amount information with previously acquired residual amount information; and decrementing the estimated number of the cartridges by one in response to a comparison result obtained by the comparing indicating that the residual amount of the recording material in the currently acquired residual amount information is greater than the residual amount of the recording material in the previously acquired residual amount information.

18. The server device according to claim 11, wherein the controller is configured to further perform:

in response to determining that the currently received cartridge identification information is inconsistent with the previously received cartridge identification information, decrementing the estimated number of the cartridges by one.

19. The server device according to claim 11, wherein the image forming apparatus comprises a connecting unit which a plurality of cartridges are connectable to and detachable from, the plurality of cartridges containing different color recording material; and wherein the controller is configured to perform:

estimating the number of the cartridges in stock at the user in each color;

transmitting to the external device via the communication interface the order instruction to deliver at once to the user the plurality of cartridges each containing the recording material in one of a first color and a second color different from the first color;

when the residual amount of the recording material in the first color is equal to or less than the first threshold and the estimated number of the cartridges containing the recording material in the first color is equal to or less than the second threshold, determining whether or not the estimated number of the cartridges containing the recording material in the second color is equal to or greater than a third threshold; and when the estimated number of the cartridges containing the recording material in the second color is equal to or greater than the third threshold, transmitting via the communication interface an inquiry about changing of a quantity of the cartridges to be delivered in accordance with the order instruction.

20. The server device according to claim 11, wherein the controller is configured to further perform:

estimating that the number of the cartridges in stock at the user is zero before transmitting the order instruction for a first time.

21. A non-transitory computer readable storage medium storing a set of program instructions installed on and executed by a server device, the server device comprising:

a communication interface configured to communicate at least with an external device; and a memory storing device identification information for identifying an image forming apparatus communicable with the server device via the communication interface, the image forming apparatus being configured to form an image on a recording sheet by using recording material, the recording material being contained in a cartridge attachable to and detachable from the image forming apparatus, the program instructions comprising:

receiving, via the communication interface, residual amount information about residual amount of the recording material remaining in the cartridge connected to the image forming apparatus identified by the device identification information;

comparing currently acquired residual amount information with previously acquired residual amount information;

estimating a number of the cartridges in stock at a user of the image forming apparatus identified by the device identification information, wherein the estimating includes specifying that the number of the cartridges in stock at the user has been decremented by one in a case where the residual amount indicated by the currently acquired residual amount information is greater than the residual amount indicated by the previously acquired residual amount information;

determining, based on the residual amount information, whether or not the residual amount of the recording material is equal to or less than a first threshold;

determining whether or not the estimated number of the cartridges is equal to or less than a second threshold; and in a case where (1) the residual amount of the recording material is equal to or less than a first threshold and (2) the estimated number of the cartridges is equal to or less than a second threshold, transmitting to the external device via the communication interface an order instruction to deliver a cartridge to the user of the image forming apparatus.

22. A non-transitory computer readable storage medium storing a set of program instructions installed on and executed by a server device, the server device comprising:

a communication interface configured to communicate at least with an external device; and a memory storing device identification information for identifying an image forming apparatus communicable with the server device via the communication interface, the image forming apparatus being configured to form an image on a recording sheet by using recording material, the recording material being contained in a cartridge attachable to and detachable from the image forming apparatus, the program instructions comprising:

receiving, via the communication interface, residual amount information about residual amount of the recording material remaining in the cartridge connected to the image forming apparatus identified by the device identification information;

receiving, via the communication interface, cartridge identification information for identifying the cartridge connected to the image forming apparatus;

determining whether currently received cartridge identification information is in coincidence with previously received identification information;

estimating a number of the cartridges in stock at a user of the image forming apparatus identified by the device identification information, wherein the estimating includes specifying that the number of the cartridges in stock at the user has been decremented by one in a case where the currently received cartridge identification information is inconsistent with the previously received cartridge identification information;

determining, based on the residual amount information, whether or not the residual amount of the recording material is equal to or less than a first threshold;

determining whether or not the estimated number of the cartridges is equal to or less than a second threshold; and in a case where (1) the residual amount of the recording material is equal to or less than a first threshold and (2) the estimated number of the cartridges is equal to or less than a second threshold, transmitting to the external device via the communication interface an order instruction to deliver a cartridge to the user of the image forming apparatus.

* * * * *

UNITED STATES PATENT AND TRADEMARK OFFICE
CERTIFICATE OF CORRECTION

PATENT NO.       : 9,858,613 B2
APPLICATION NO.  : 15/637572
DATED            : January 2, 2018
INVENTOR(S)      : Makoto Matsuda It is certified that error appears in the above-identified patent and that said Letters Patent is hereby corrected as shown below:

Column 19, Claim 19, Lines 10-11:
Delete "changing of a quantity of" and insert --changing a quantity of--

Signed and Sealed this
Twenty-second Day of May, 2018

Andrei Iancu
*Director of the United States Patent and Trademark Office*